United States Patent Office 3,329,648
Patented July 4, 1967

3,329,648
COMPOSITIONS OF MATTER COMPOSED OF VINYL POLYMERS AND INORGANIC PHOTOCHROMIC OXIDES
John A. Chopoorian, Stamford, Conn., assignor to American Cyanamid Company, Stamford, Conn., a corporation of Maine
No Drawing. Filed Nov. 21, 1962, Ser. No. 239,326
20 Claims. (Cl. 260—41)

This invention relates to novel compositions of matter. More particularly, this invention relates to novel compositions of matter comprising polymers of various esters of acrylic and methacrylic acids, styrenes or vinyl halides having uniformly dispersed throughout the body thereof, an inorganic photochromic material. Still more particularly, this invention relates to novel compositions of matter comprising polymers of various esters of acrylic and methacrylic acids, styrenes or vinyl halides having uniformly dispersed throughout the body thereof, a photochromic material comprising various admixtures of inorganic metal oxides.

Photochromic materials are known and have been used as the active ingredients in such articles as data storage devices, reflectants for incident high-intensity radiation, photochemical printing and the like. There has, however, to my knowledge been no disclosure of the production of compositions of matter comprising highly stable, very sensitive, rapid color-changing photochromic materials uniformly dispersed throughout polymers of esters of acrylic and methacrylic acids, styrenes or vinyl halides.

I have now discovered that certain metal oxide photochromic materials may be directly and uniformly incorporated into polymers of acrylic and methacrylic acid esters, styrenes or vinyl halides by (either (1) carrying out the monomeric polymerization in the presence of the photochromic material or (2) physically blending or admixing the polymer with the photochromic material, such as by the use of a three-roll mill. It was indeed surprising and unexpected to find that the photochromic inorganic oxides still functioned as efficiently in the solid polymer binder as in the solid uncombined state. It is well known that many solid inorganic photochromic materials which change their color in the solid state, do not continue to function as photochromic materials after having been dispersed throughout a solid binder. For example, $TiO_2$ doped with an iron oxide functions as a photochromic material in the pure solid state, however, upon incorporation thereof into a solid glass binder, will not change color upon contact with ultraviolet rays.

However, I have discovered novel compositions of matter comprising solid polymeric esters of acrylic and methacrylic acids, styrenes and vinyl halides containing certain inorganic metal oxides, in uniform molecular distribution, which continue to function as photochromic materials upon contact with irradiation, i.e. ultraviolet light. These novel compositions thereby permit the temporary recording of data, images or designs and the production of various articles heretofore not possible utilizing prior art products. Additionally, the products are produced in an easily-handled state.

The prior art devices of this type present many deficiencies and problems which have heretofore been very difficult to overcome. In regard to various commercially available storage devices and photographic instruments for instance, the light sensitive material must be prevented from coming into contact with white light, such as by storage in the dark or by coating the material with a protective film, such as a gel or tin foil etc. The compositions of my invention, however, need only be removed from the light a short time before use in order to be transformed into their original color. Additionally, these prior art devices decompose rapidly because of their relatively poor stability and therefore must be used within a certain date after their manufacture. However, the novel compositions of matter of the present invention are very stable, easily handled, can be stored for extended periods of time, without fear of damage by white light and still possess, all the properties necessary and desired for the above-enumerated uses.

The novel compositions of my invention are moldable, castable etc. by all known techniques into discs, plates, films, foils and the like. Since the color change of the photochromic compounds, more fully discussed hereinbelow, is evident in the solid state in admixture with acrylic and methacrylic acid ester, styrene and vinyl halide polymers, the necessity of laminated construction and/or encapsulation and their accompanying disadvantages in the use of other photochromic materials have been obviated by my novel compositions.

It is an object of the present invention to provide novel compositions of matter.

It is a further object of the present invention to provide novel compositions of matter comprising polymers of various esters of acrylic and methacrylic acids, styrenes and vinyl halides having uniformly dispersed throughout the body thereof, an inorganic photochromic material.

It is a further object of the present invention to provide novel compositions of matter comprising solid polymers of various esters of acrylic and methacrylic acids, styrenes and vinyl halides having uniformly dispersed therethrough, a photochromic material comprising one of various admixtures of inorganic metal oxides.

These and other objects will become more apparent to those skilled in the art upon reading the more detailed description of my invention set forth hereinbelow.

As mentioned above, molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed the system reverts to its original state.

Photochromism has been observed in inorganic and organic compounds both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism is electron delocalization. This mechanism is rapidly reversible in organic molecules and therefore usually produces no colored intermediate. However, in inorganic crystals, photoinitiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

A. ABSORPTION OF INCIDENT RADIATION

According to the quantum theory, each absorbed quantum creates one activated molecule and only absorbed radiation can produce a chemical change. Variables which control the number of photons absorbed include the concentration and extinction coefficient of the photochrome, the screening coefficients of other components of the system, and the wavelengths of the incident radiation.

B. QUANTUM YIELD

All excited molecules will not undergo transformation to the colored form, so that the quantum yield will generally be less than unity. Various deactivating processes which compete for the excited molecules include fluorescence, phosphorescence, permanent chemical change and thermal release.

C. THE REVERSE REACTION

In both the forward and reverse reactions, the concentration of the colored form is dependent on the intensity of the radiation, the kinetics of the reverse reactions, and temperature of the reactions. The kinetics for the reverse reaction will normally be controlling, however some reverse reactions are thermally sensitive and are accelerated by irradiation or heating.

By the terms "photochromic compound," "photochromic substance" or "photochromic material," as used in the instant disclosure, is meant compounds, substances or materials which change their transmission or reflectance upon being subjected to ultraviolet or visible irradiation and subsequently revert to their original state upon subjection thereof to a different wavelength of radiation, or removal of the initial ultraviolet source.

The ability of various materials to change color and to then revert back to their original color is not a new phenomenon. In fact, such compounds have been widely used in various ways, as described above. Generally, these compounds change their color when exposed to ordinary sunlight and revert back to their original color upon removal thereof from the rays of the sun. Various other materials, however, change color only when subjected to a certain degree of irradiation, and as such, sunlight will not affect them. High intensity radiation, such as 10–25 cal./cm.$^2$/sec. or more is necessary in regard to these compounds, while sunlight (0.2 cal./cm.$^2$/sec.) will affect the former.

I have discovered a group of photochromic materials which may be incorporated into solid state polymers of esters of acrylic and methacrylic acids, styrenes or vinyl halides thereby forming the novel compositions of the present invention having the several advantages mentioned above.

These photochromic materials are admixtures of inorganic metal oxides. The admixtures generally consist of a primary or host inorganic metal oxide doped with a lesser or contaminating amount of another guest inorganic metal oxide. The admixtures which are contemplated as useful in the novel compositions of my invention are the following: $TiO_2$ doped with $Fe_2O_3$, FeO, $Cr_2O_3$, CuO, NiO, $MnO_2$ or $Mn_2O_3$; $Nb_2O_5$ doped with $Fe_2O_3$, FeO, $Cr_2O_3$, CuO, $V_2O_5$, $MnO_2$ or $Mn_2O_5$; $Al_2O_3$ doped with $Cr_2O_3$ or $V_2O_5$; ZnO doped with CuO or $V_2O_5$; $SnO_2$ doped with CuO; or $ZrO_2$ doped with CuO or NiO. In regard to the $TiO_2$, the rutile form of the compound is sufficient, however, the anatase form containing at least 5% of the rutile material is preferred. These admixtures contain from about 0.01 to 5.0 mole percent of the doping guest oxide, preferably 0.1 to 2.0 mole percent, based on the number of moles of the host oxide.

These doped oxides are well known in the art and generally may be prepared by any applicable method. Various methods which may be used include those set out in the following articles. Williamson, Nature (London), 140, 238 (1937); McTaggert et al., J. Appl. Chem. 5, 643 (1955); Frydryck, Doctoral Thesis, Free University of Berlin (1961), and the method set forth hereinbelow.

I have also discovered a second group of photochromic materials that may be employed in the present invention. The second group comprises admixtures of $TiO_2$ with a combination of two doping (guest) metal oxides. I have found that these mixtures of guest oxides, in admixture with $TiO_2$, exhibit a more pronounced effect in the color intensity of the products than either doping metal (guest) oxide used alone. For example, $TiO_2$ doped with $Fe_2O_3$ or FeO and NiO or $TiO_2$ doped with $Fe_2O_3$ or FeO and CuO, result in a more intense color change than $TiO_2$ doped with $Fe_2O_3$, FeO, NiO or CuO, alone. That is to say, a synergistic effect is observed wherein the results obtained utilizing a mixture of guest oxides is better than that obtained from either guest oxide alone or the mere additive results of both together. Here, again, the rutile form of the host compound is satisfactory, but the anatase form containing at least 5% of the rutile material is preferred. When a combination of the different doping oxides are used, amounts ranging from 100:1 to 10:1, preferably 25:1 to 5:1, of the iron oxide to the nickel or copper oxide are satisfactory, the total amount of the mixed oxides still however, being within the range (in mole percent) specified above.

These admixtures of host and guest oxides, either, as such, or with combinations of doping guest oxides, may be prepared, among other methods, by slurrying a solution of the doping metal oxide salt, the guest metal oxide itself, or mixtures thereof, with the host metal oxide. The slurry is evaporated and ground, then calcined at a temperature between 400° and 1100° C. to give the active admixture. In the case of $TiO_2$, the host crystalline compound desired can be previously prepared, or starting the admixture preparation with anatase, the desired final proportion of rutile can be controlled by the length of time the admixture is calcined above the phase transition temperature (ca. 880° C.). The final active admixtures are not merely mechanical or physical blends, but are crystalline materials consisting of a host material matrix wherein is contained substitutionally or interstitially, the doping guest metal oxide.

I have also discovered another group of photochromic inorganic oxide admixtures which may be used in the compositions of the present invention. This third class of materials, in order of preference, are $TiO_2$ in admixture with $MoO_3$ or $WO_3$. These admixtures are produced in mole ratios of about 1 to 15 mole percent of $TiO_2$ to about 25 to 1 mole percent of $MoO_3$ or $WO_3$. The preferred mole ratios range from about 1:4 to about 12:1, respectively. The $TiO_2$ component may be in either the rutile, anatase, or mixed phase form, and in place of $TiO_2$ other metal oxide components may be used, such as, for example, ZnO, $ZrO_2$, $SnO_2$ and $GeO_2$ in the same mole ratio given above for $TiO_2$.

These two phase materials constituting the third class of photochromic materials are novel compounds and are prepared as described and claimed in copending application Ser. No. 239,159, filed concurrently herewith. In a typical procedure, the compounds are prepared by dissolving the $MoO_3$ or $WO_3$ in an aqueous basic solution and adding to this solution an acidified aqueous slurry or solution of the primary metal oxide component. After heating at up to 100° C. for several hours or longer, the desired active material is formed in a very high yield, separated from the solvent, washed free of acid and dried.

Superficially taken, it would appear that the third class of materials are merely a mechanical or physical mixture of the two oxide components. However, these latter chemically prepared coprecipitated materials are of extremely great photo-sensitivity in comparison to a mixture of their individual metal oxides. Additionally, X-ray evidence clearly indicates that the crystalline matrix of the $MoO_3$ or $WO_3$ has been completely altered. Although not wishing to be bound by any particular theory it is possible that this phenomena can be explained as follows. Since the photochromic color in these compounds is deep blue, the most likely theoretical alternatives as to the nature of this photochromic reaction is that a net electron delocalization to Mo or W takes place either by an inter- or intra-phase photoinitiated electron transfer from the second component of the active material. Because of the degradation of these Mo and W compounds at higher temperatures, it is preferred that the resins containing them be cast instead of molded, however, molding them is possible, although somewhat less practical than casting.

The amount of the inorganic metal oxide (photochromic material), in any instance, incorporated into the resinous polymers is not critical and depends upon the intensity of the color of the composition desired upon irradiation thereof. Generally, however, it is necessary to incorporate at least about 1.0% and usually up to about 70%, by weight, of the photochromic material into the polymer, based on the weight of the resinous polymer. It is preferred, however, that more than 20%, by weight, of the photochromic material be added. At amounts much below 20%, by weight, translucence occurs and the resulting composition is only partially transparent. Such compositions are useful as variable translucence devices; but are of limited value in applications that require the ultimate in transparency, such as, for example, window panes, etc.

The various esters of acrylic acid and methacrylic acid which may be used to form the polymers used in a group of the instant compositions are those having the formula (I) 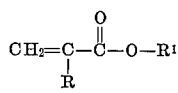

wherein R is hydrogen or a methyl radical and $R^1$ is an alkyl radical having 1 to 6 carbon atoms, inclusive. Compounds which are represented by Formula I and consequently may be used in the present invention include methyl acrylate, ethyl acrylate, n-propyl acrylate, isopropyl acrylate, n-butyl acrylate, isobutyl acrylate, t-butyl acrylate, amyl acrylate, hexyl acrylate, methyl methacrylate, ethyl methacrylate, n-propyl methacrylate, isopropyl methacrylate, n-butyl methacrylate, isobutyl methacrylate, t-butyl methacrylate, amyl methacrylate, hexyl methacrylate and the like.

The acrylic and methacrylic acid esters may be polymerized alone or in combination with other ethylenically unsaturated monomers in varying amounts, however, generally it is preferred that the final polymer has a preponderance of the acrylic or methacrylic acid ester therein, i.e. at least 51% by weight, based on the total weight of the monomers.

The styrene monomers which may be also utilized in the present invention to form my novel compositions are those having the formula

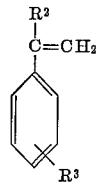

wherein $R^2$ is hydrogen or a lower alkyl radical having 1 to 4 carbon atoms, inclusive, and $R^3$ is hydrogen, a lower alkyl radical having 1 to 4 carbon atoms, inclusive, or a halogen radical. Suitable monomers represented by this formula include styrene, methyl-styrene, ethylstyrene, propylstyrene, butylstyrene, chlorostyrene, bromostyrene, fluorostyrene, iodostyrene, α-methyl styrene, α-ethyl styrene, α-butyl styrene, α-methyl methylstyrene, α-methyl ethylstyrene, α-butyl ethylstyrene, α-ethyl chlorostyrene, α-propyl iodostyrene and the like.

These styrene monomers may also be polymerized alone or in combination with other ethylenically unsaturated monomers in amounts equivalent to those set forth hereinabove in regard to the acrylic and methacrylic acid esters.

The vinyl halide monomers which may be used in the present invention are well known in the art and generally vinyl chloride is the preferred compound because of its availability and cost. However, the present invention is also of sufficient scope so as to include vinyl fluoride which is becoming increasingly more useful in many fields. The vinyl halide polymers may be used in the pure homopolymeric form however, inasmuch as commercially available vinyl halide resins generally are produced containing minor amounts, i.e. up to about 20% of copolymeric material, resins of this sort are also applicable herein. Commercially available poly(vinyl chloride) for example, may contain up to about 1.0% of other constituents such as vinyl acetate, in copolymeric form. These vinyl halides also may be employed in copolymeric form containing major amounts of comonomers, generally in the amounts as indicated above in regard to the esters of acrylic and methacrylic acids.

Examples of applicable comonomeric compounds which may be copolymerized with the acid esters, the styrenes or the vinyl halides to form copolymers thereof as indicated above, include the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, oxalic, malonic, succinic, glutaric, adipic, pimelic, suberic, azelaic, sebacic, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; various vinyl compounds, e.g., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole; unsaturated ethers, e.g., ethyl vinyl ether, diallyl ether, methyl methallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized are the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that can be copolymerized are allyl alcohol, methallyl alcohol, diallyl carbonate, allyl lactate, allyl alphahydroxyisobutyrate, allyl trichlorosilane, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example in U.S. Patent No. 2,510,503, issued June 6, 1950.

The actual polymerization process employed during which the photochromic material is completely and uniformly dispersed throughout the styrene, vinyl halide or acrylic or methacrylic acid ester polymer during polymerization, is not critical, and generally any known process for the polymerization of the monomer being polymerized may be employed.

For example, a polymerization method which may be used comprises conducting the polymerization of any of the applicable monomers or comonomers in the presence of a free-radical generating catalyst at temperatures of from about 10° C. to 90° C. utilizing known procedures. Any known free radical generating catalyst which initiates the polymerization of, for example, methyl methacrylate, styrene or vinyl chloride may be used. Suitable catalysts include, for example, the organic peroxides such as methyl ethyl ketone peroxide, benzoyl peroxide; the hydroperoxides such as cumene hydroperoxide; the persulfate type compounds such as potassium persulfate or catalysts such as azobisisobutyronitrile and the like. Additionally, such catalysts as lauroyl peroxide, 2,5-dimethyl-2,5-di(t-butylperoxy)hexane; the dialkyl peroxides, e.g., diethyl peroxide, dipropyl peroxide, dilauryl peroxide, dioleyl peroxide, distearyl peroxide, di(tertiary-butyl)peroxide and di(tertiary-amyl)peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides; etc.; unsymmetrical or mixed diacyl peroxides, e.g. acetyl benzoyl peroxide, propionyl benzoyl peroxide, etc.; terpene oxides, e.g. ascaridole, etc.; and salts of inorganic per-acids, e.g. ammonium persulfate, sodium persulfate, sodium percarbonate, potassium percarbonate, sodium perborate, potassium perborate, sodium perphosphate, potassium perphosphate, etc. Other examples of organic peroxide catalysts which may be employed are the following: tetraline hydroperoxide, tertiary-butyl diperphthalate, tertiary-butyl perbenzoate, 2,4-dichlorobenzoyl peroxide, urea peroxide, caprylyl peroxide, p-chlorobenzoyl peroxide, 2,2-bis(tertiary-butylperoxy) butane, hydroxyheptyl peroxide, the diperoxide of benzaldehyde and the like. Catalyst concentrations ranging from 0.001 to 5.00 parts, by weight, based on the weight of the monomer employed may advantageously be used.

When emulsion polymerization processes are employed, any available emulsifier may be used, with compounds such as fatty acid soaps, rosin soaps, sodium lauryl sulfate, non-ionic emulsifiers such as polyethoxy alkylated phenols, compounds such as dioctyl sodium sulfosuccinate, dihexyl sodium sulfosuccinate and the like, in amounts ranging from about 1% to 8%, by weight, preferably 4% to 5%, by weight, based on the amount of monomer employed.

When actual physical blending of the prepared polymer and photochromic substance is desired, known procedures such as utilizing a ball mill, hot rolls, emulsion blending techniques, Banbury mixers, Waring blenders and the like are effective. Another procedure which may be employed is known as a devolatilization-extrusion method, wherein separate streams of solutions of the polymer and photochromic material are subjected to mixing, compounding, devolatilization and extrusion in commercially available devices. In the devolatilizer-extruder, the mixture is worked in a chamber under heat and vacuum so that new surfaces of the polymer mixture are continuously and rapidly exposed to vacuum to remove the solvent before extruding the product. The term "devolatilization" as herein employed refers to the step in which the nonpolymeric material is removed from the solution of the polymer. The apparatus which simultaneously devolatilizes and extrudes the material comprises a chamber with one or more screws having a close tolerance with the wall for compounding the material in its passage therethrough, and at least one vacuum chamber for removing the volatile components of the feed. The action of working the material under the close tolerance of the screws not only intimately blends the mixture, but generates substantial heat which aids in the devolatilizing of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e. not under vacuum, wherein various volatiles or non-volatile modifiers, fillers, lubricants, stabilizers, plasticizers, colorants or the like, may be incorporated into the novel compositions of this invention and extruded therewith.

The vacuum sections of the devolatilizer-extruder are heated to temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the two streams are introduced into the devolatilizer-extruder the increased temperature causes volatilization of the solvent therefrom. At the same time, because the extruder is maintained at subatmospheric pressures, the volatile material is withdrawn or volatilized from solution of polymer and photochromic material.

The novel compositions of matter of the present invention may be molded or cast etc. into such shaped articles as films, foils, fibers, moldings, castings, laminates and the like. Specific properties and characteristics of these articles of this type are set forth more fully hereinbelow in regard to the examples listed.

A preferred group of compositions of matter of the present invention consists of the above-identified styrene, vinyl halide or acrylate and methacrylate polymeric compounds in admixture with photochromic compounds wherein the polymer has been incompletely polymerized. Generally, a polymer which has been at least 20% converted is satisfactory for this purpose. In this instance, a prepolymer of the desired monomer or group of monomers, is produced in any known manner such as by terminating the polymerization by the addition of a chain stopper, and a final composition is produced which may be subsequently cured or completely polymerized by the ultimate consumer into any desired end product by merely applying heat. Therefore, the prepolymer compositions may be cast, molded etc. to form various articles and shape, size and form thereof being that required by the user. In this manner, plastic window panes, skylights, containers, memory devices such as optical analogue computers, temporary oscillographs, temporary photographic proofs, light switches, optical masks, wall panels, costume jewelry, toys, advertising articles and the like may be produced as needed.

The compositions of the present invention may further be modified by the addition of such materials as fillers, lubricants, plasticizers, colorants, etc. as mentioned above. It is also possible to lengthen the life of the compositions by incorporating various amounts of ultraviolet light absorbers into them or by coating the articles formed from the compositions, with a material containing an ultraviolet light absorber. When additives such as these are added, any conventional compound known to function as a UV absorber may be employed. Examples of such compounds are the 2-hydroxy benzophenones, e.g. 2,4-dihydroxy benzophenone; the 2-(2-hydroxyphenyl)-benzotriazoles, e.g. 2-(2-hydroxy-4-methoxyphenyl)benzotriazole and the like. In this manner, the photochromic life of the inorganic oxide photochromic additive is lengthened by preventing an extraneous amount of ultraviolet light from coming into contact with the photochromic material. When absorbers of this type are added, amounts up to about 20%, by weight, based on the weight of the polymer, may be used.

The following examples are set forth for purposes of illustration only and are not to be construed as limitations on the present invention except as set forth in the appended claims. All parts and percentages are by weight unless otherwise noted.

Example 1

A singly doped metal oxide, $TiO_2$ activated by 0.2% $Fe_2O_3$, by weight, was milled at a 20% concentration, by weight, with polymethyl methacrylate molding powder. The mixture was then heat molded at 155° C. in the shape of a toy doll. The normal color of the doll so made was skin colored and upon irradiation with sunlight for less than 1 minute became a dark tan thereby simulating suntanning. After bringing the doll indoors for approximately ½ hour, the tan faded and the "doll's skin" returned to its normal color. In an exposure test, the toy was left outdoors for five summer months, April to August and showed no depletion of its tanning ability or other adverse effects.

Example 2

A doubly doped metal oxide, $TiO_2$ activated by 0.2% $Fe_2O_3$ and 0.02% CuO, by weight, was blended into a polystyrene molding powder at a 5% weight proportion and polymerized between two sheets of glass to give a translucent photochromic construction material. This variable translucent ⅛″ panel was heat formed into a dome-shaped skylight. The device, upon contact with the rays of the sun, was a more deeply colored tan than that made using $TiO_2$ singly doped with equivalent amounts of $Fe_2O_3$. Upon exposure of the skylight to the sun from April to August, no visible effect in regard to intensity of color or rapidity of color change was observable.

Example 3

The material $TiO_2 \cdot 12WO_3$ (produced by reacting one mole $TiO_2$ with 12 moles $WO_3$) was blended into a poly(methyl methacrylate) casting syrup at a 30% weight proportion, and polymerized between two sheets of glass to give an opaque faint yellow photochromic panel of ⅛″ thickness. This panel acted as a temporary photographic recorder, in that in less than one minute, vivid blue-green positives were obtained by irradiating this panel in contact with a photographic negative. The positive image fades very slowly, but the fading was markedly accelerated by heating the panel at 90° C.

Example 4

A doubly doped metal oxide, $TiO_2$ activated by 0.2% $Fe_2O_3$ and 0.02% NiO, was milled at a 50% concentration, by weight, with poly(vinyl chloride) molding powder. The mixture was then heat molded into an opaque, off-white 12 sq. in. tile of ⅛″ thickness. By irradiating the tile for less than one minute through a suitable template, a chess, checkers, backgammon, etc. board was produced which could be used for a period of 30 to 40 minutes before fading. The active color was a deep tan and could be faded more rapidly at an elevated temperature.

Example 5

The material $TiO_2 \cdot 6WO_3$ (produced by reacting one mole $TiO_2$ with 6 moles $WO_3$) was blended into a poly(methyl methacrylate) film-forming syrup at a 60% concentration. The film formed from this blend, in less than 30 seconds, turned a sharp blue-green positive by exposing it to ultraviolet light in contact with a negative. The positive image faded slowly but was accelerated in its fading by heat treatment. The images were made stable for many months by coating the film with a clear poly(methyl methacrylate) film containing 15%, by weight, of 2,4-dihydroxy benzophenone.

The following table shows the unexpected increase in color intensification utilizing my novel oxide admixtures over those wherein the host oxide is doped with only one other guest oxide.

TABLE I.—PROPERTIES OF CASTINGS OF POLY(METHYL METHACRYLATE) CONTAINING 20% OF VARIOUS METAL OXIDE PHOTOCHROMIC MATERIALS

| Material (in order of greatest color change) | Color Change | Time Activation (sec.) | Time [a] Reverse (min.) |
|---|---|---|---|
| $TiO_2$ [b] (0.2% $Fe_2O_3$) | Off-white to tan | <60 | 30–40 |
| $TiO_2$ [b] activated by (0.2% $Fe_2O_3$ and 0.02% CuO) | Off-white to deep tan | <60 | 30–40 |
| $TiO_2 \cdot 12MoO_3$ | White to deep blue | <60 | Several days |
| $ZnO \cdot 6WO_3$ | Faint yellow to deep blue-green | <30 | Several hours |

[a] These reverse times can be accelerated by heat treatment.
[b] $TiO_2$ host is 95% anatase—5% rutile.

TABLE II

| Example | Resin | Activated With— | Color Change | Time Activation (sec.) |
|---|---|---|---|---|
| 6 | PMMA | $TiO_2 + FeO$ | Off-white to tan | 60 |
| 7 | PMMA | $TiO_2 + Cr_2O_3$ | Off-white to light tan | 1,800 |
| 8 | PMMA | $TiO_2 + CuO$ | do | 120 |
| 9 | PMMA | $TiO_2 + NiO$ | do | 120 |
| 10 | PMMA | $TiO_2 + MnO_2$ | do | 100 |
| 11 | PMMA | $TiO_2 + Mn_2O_3$ | do | 100 |
| 12 | PMMA | $TiO_2 + Fe_2O_3 + NiO$ | Off-white to deep tan | 60 |
| 13 | PVC | $TiO_2 + FeO + NiO$ | do | 60 |
| 14 | PVC | $TiO_2 + FeO + CuO$ | Off-white to brown | 60 |
| 15 | PVC | $Nb_2O_5 + Fe_2O_3$ | Off-white to grey | 1,200 |
| 16 | PVC | $Nb_2O_5 + FeO$ | do | 1,200 |
| 17 | PVC | $Nb_2O_5 + Cr_2O_3$ | do | 2,400 |
| 18 | PS | $Nb_2O_5 + CuO$ | do | 1,400 |
| 19 | PS | $Nb_2O_5 + V_2O_5$ | do | 2,400 |
| 20 | PS | $Nb_2O_5 + MnO_2$ | do | 1,500 |
| 21 | PS | $Nb_2O_5 + Mn_2O_5$ | do | 1,500 |
| 22 | PS | $Al_2O_3 + Cr_2O_3$ | Off-white to grey | 3,600 |
| 23 | PS | $Al_2O_3 + V_2O_5$ | do | 3,600 |
| 24 | PS | $ZnO + CuO$ | do | 2,700 |
| 25 | PMMA | $ZnO + V_2O_5$ | do | 2,700 |
| 26 | PMMA | $SnO_2 + CuO$ | Off-white to deep tan | 2,700 |
| 27 | PMMA | $ZrO_2 + CuO$ | Off-white to grey | 2,700 |
| 28 | PMMA | $ZrO_2 + NiO$ | do | 2,700 |
| 29 | PVC | $TiO_2 \cdot WO_3$ | Faint yellow to blue-green | 60 |
| 30 | PVC | $TiO_2 \cdot WO_3$ | Faint yellow to deep blue green | 300 |
| 31 | PVC | $ZnO \cdot MoO_3$ | White to light blue / White to blue | 60 / 300 |
| 32 | PS | $ZrO_2 \cdot MoO_3$ | White to light blue / White to blue | 60 / 300 |
| 33 | PS | $ZrO_2 \cdot WO_3$ | Faint yellow to light blue-green | 60 |

See footnotes at end of tables.

TABLE II—Continued

| Example | Resin | Activated With— | Color Change | Time Activation (sec.) |
|---|---|---|---|---|
| 34 | PVC | $SnO_2 \cdot MoO_3$ | White to light blue / White to blue | 60 / 300 |
| 35 | PVC | $SnO_2 \cdot WO_3$ | Faint yellow to light blue-green. | 60 |
| 36 | PMMA | $GeO_2 \cdot WO_3$ | ---do--- | 60 |
| 37 | PMMA | $GeO_2 \cdot MoO_3$ | White to light blue / White to blue | 60 / 300 |

PMMA = Poly(methyl methacrylate).
PS = Polystyrene.
PVC = Poly(vinyl chloride).

Table II, above, discloses the effectiveness of color change and activation of poly(methyl methacrylate), polystyrene and poly(vinyl chloride) resins containing the various photochromic oxides of the present invention. In each example the oxide was incorporated into the resin, in equal amounts, as disclosed in Examples 1, 2, 3 and 5, i.e., Examples 6–11 and 15–28 followed Example 1; Examples 12–14 followed Example 2; Examples 29–33 followed Example 3 and Examples 34–37 followed Example 5.

I claim:
1. A composition of matter comprising a polymer of a compound selected from the group consisting of (1) those having the formula

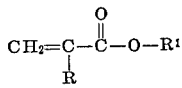

wherein R is selected from the group consisting of hydrogen and a methyl radical and $R^1$ is an alkyl radical having 1 to 6 carbon atoms, inclusive, (2) those having the formula

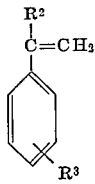

wherein $R^2$ is selected from the group consisting of hydrogen and a lower alkyl radical having 1 to 4 carbon atoms, inclusive, and $R^3$ is selected from the group consisting of hydrogen, a lower alkyl radical having 1 to 4 carbon atoms, inclusive, and a halogen radical, and (3) a vinyl halide, having uniformly dispersed throughout the body thereof from about 1.0% to about 70%, by weight, based on the weight of the polymer, of an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, a mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) ZnO doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$ and (K) $GeO_2$ reacted with an oxide selected from the group consisting of $MoO_3$ and $WO_3$, the amount of $Fe_2O_3$, FeO, $Cr_2O_3$, CuO, NiO, $MnO_2$, $Mn_2O_5$, $V_2O_5$, $Mn_2O_3$, mixtures of $Fe_2O_3$ and NiO, mixtures of $Fe_2O_3$ and CuO, mixtures of FeO and NiO and mixtures of FeO and CuO in groups (A), (B), (C), (D), (E) and (F) ranging from about 0.01 to about 5.0 mole percent; the amount of iron oxide to nickel oxide or copper oxide in said mixtures of group (A) ranging from about 100:1 to about 10:1; the $TiO_2$ in group (A) being rutile containing up to 95% anatase and the amount of $TiO_2$, ZnO, $ZrO_2$, $SnO_2$ and $GeO_2$ in groups (G), (H), (I), (J) and (K) ranging from about 1–15 mole percent of each to about 25–1 mole percent of $MoO_3$ or $WO_3$.

2. A composition according to claim 1 wherein the compound has the formula

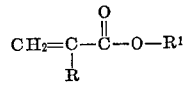

wherein R is selected from the group consisting of hydrogen and a methyl radical and $R^1$ is an alkyl radical having 1 to 6 carbon atoms, inclusive.

3. A composition according to claim 1 wherein the compound has the formula

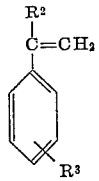

wherein $R^2$ is selected from the group consisting of hydrogen and a lower alkyl radical having 1 to 4 carbon atoms, inclusive, and $R^3$ is selected from the group consisting of hydrogen, a lower alkyl radical having 1 to 4 carbon atoms, inclusive, and a halogen radical.

4. A composition according to claim 1 wherein the compound is a vinyl halide.

5. A composition according to claim 1 containing, in addition to the inorganic photochromic material, up to about 20%, by weight, based on the weight of the polymer, of an ultraviolet light absorber.

6. A composition according to claim 2 containing, in addition to the inorganic photochromic material, up to about 20%, by weight, based on the weight of the polymer, of an ultraviolet light absorber.

7. A composition according to claim 3 containing, in addition to the inorganic photochromic material, up to about 20%, by weight, based on the weight of the polymer, of an ultraviolet light absorber.

8. A composition according to claim 4 containing, in addition to the inorganic photochromic material, up to about 20%, by weight, based on the weight of the polymer, of an ultraviolet light absorber.

9. A composition of matter comprising a polymer of a compound selected from the group consisting of (1) those having the formula

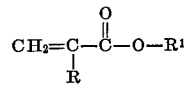

wherein R is selected from the group consisting of hydrogen and a methyl radical and $R^1$ is an alkyl radical having 1 to 6 carbon atoms, inclusive, (2) those having the formula

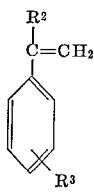

wherein $R^2$ is selected from the group consisting of hydrogen and a lower alkyl radical having 1 to 4 carbon atoms, inclusive, and $R^3$ is selected from the group consisting of hydrogen, a lower alkyl radical having 1 to 4 carbon atoms, inclusive, and a halogen radical, and (3) a vinyl halide, having uniformly dispersed throughout the body thereof from about 1.0% to about 70%, by weight, based on the weight of the polymer, of an inorganic photochromic material selected from the group consisting of (A) $TiO_2$ doped with an oxide selected from the group consisting of $Fe_2O_3$, $FeO$, $Cr_2O_3$, $CuO$, $NiO$, $MnO_2$ and $Mn_2O_3$, (B) $Nb_2O_5$ doped with an oxide selected from the group consisting of $Fe_2O_3$, $FeO$, $Cr_2O_3$, $CuO$, $V_2O_5$, $MnO_2$ and $Mn_2O_5$, (C) $Al_2O_3$ doped with an oxide selected from the group consisting of $Cr_2O_3$, and $V_2O_5$, (D) $ZnO$ doped with an oxide selected from the group consisting of $CuO$ and $V_2O_5$, (E) $SnO_2$ doped with $CuO$, and (F) $ZrO_2$ doped with an oxide selected from the group consisting of $CuO$ and $NiO$, the amount of $Fe_2O_3$, $FeO$, $Cr_2O_3$, $CuO$, $NiO$, $MnO_2$, $Mn_2O_5$, $V_2O_5$ and $Mn_2O_3$, in groups (A), (B), (C), (D), (E) and (F) ranging from about 0.01 to about 5.0 mole percent; the $TiO_2$ in group (A) being rutile containing up to 95% anatase.

10. A composition of matter comprising a polymer of a compound selected from the group consisting of (1) those having the formula

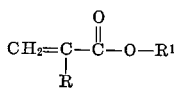

wherein R is selected from the group consisting of hydrogen and a methyl radical and $R^1$ is an alkyl radical having 1 to 6 carbon atoms, inclusive, (2) those having the formula

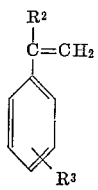

wherein $R^2$ is selected from the group consisting of hydrogen, and a lower alkyl radical having 1 to 4 carbon atoms, inclusive, and $R^3$ is selected from the group consisting of hydrogen, a lower alkyl radical having 1 to 4 carbon atoms, inclusive, and a halogen radical, and (3) a vinyl halide, having uniformly dispersed throughout the body thereof from about 1.0% to about 70%, by weight, based on the weight of the polymer, of an inorganic photochromic material selected from the group consisting of (G) $TiO_2$ reacted with an oxide selected from the group consisting of $MoO_3$ and $WO_3$, (H) $ZnO$ reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$, the amount of $TiO_2$, $ZnO$, $ZrO_2$, $SnO_2$ and $GeO_2$ in groups (G), (H), (I), (J) and (K) ranging from about 1–15 mole percent of each to about 25–1 mole percent of $MoO_3$ or $WO_3$.

11. A composition of matter comprising a polymer of a compound selected from the group consisting of (1) those having the formula

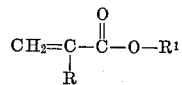

wherein R is selected from the group consisting of hydrogen and a methyl radical and $R^1$ is an alkyl radical having 1 to 6 carbon atoms, inclusive, (2) those having the formula

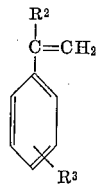

wherein $R^2$ is selected from the group consisting of hydrogen and a lower alkyl radical having 1 to 4 carbon atoms, inclusive, and $R^3$ is selected from the group consisting of hydrogen, a lower alkyl radical having 1 to 4 carbon atoms, inclusive, and a halogen radical and (3) a vinyl halide having uniformly dispersed throughout the body thereof from about 1.0% to about 70%, by weight, based on the weight of the polymer, of an inorganic photochromic material selected from the group consisting of (a) $TiO_2$ doped with a mixture of $Fe_2O_3$ and $NiO$, (b) $TiO_2$ doped with a mixture of $Fe_2O_3$ and $CuO$, (c) $TiO_2$ doped with a mixture of $FeO$ and $NiO$, and (d) $TiO_2$ doped with a mixture of $FeO$ and $CuO$, the amount of mixtures of $Fe_2O_3$ and $NiO$, mixtures of $Fe_2O_3$ and $CuO$, mixtures of $FeO$ and $NiO$ and mixtures of $FeO$ and $CuO$ in said (a), (b), (c) and (d) ranging from about 0.01 to about 5.0 mole percent; the amount of iron oxide to nickel oxide or copper oxide in said mixtures ranging from about 100:1 to about 10:1 and the $TiO_2$ in said (a), (b), (c) and (d) being rutile containing up to 95% anatase.

12. A composition according to claim 9 wherein the compound has the formula

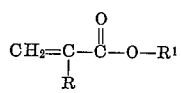

wherein R is selected from the group consisting of hydrogen and a methyl radical and $R^1$ is an alkyl radical having 1 to 6 carbon atoms, inclusive.

13. A composition according to claim 9 wherein the compound has the formula

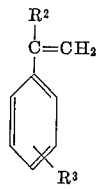

wherein $R^2$ is selected from the group consisting of hydrogen and a lower alkyl radical having 1 to 4 carbon atoms, inclusive, and $R^3$ is selected from the group consisting of hydrogen, a lower alkyl radical having 1 to 4 carbon atoms, inclusive, and a halogen radical.

14. A composition according to claim 9 wherein the compound is a vinyl halide.

15. A composition according to claim 10 wherein the compound has the formula

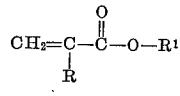

wherein R is selected from the group consisting of hydrogen and a methyl radical and $R^1$ is an alkyl radical having 1 to 6 carbon atoms, inclusive.

16. A composition according to claim 10 wherein the compound has the formula

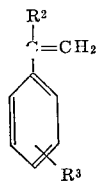

wherein R² is selected from the group consisting of hydrogen and a lower alkyl radical having 1 to 4 carbon atoms, inclusive, and R³ is selected from the group consisting of hydrogen, a lower alkyl radical having 1 to 4 carbon atoms, inclusive, and a halogen radical.

17. A composition according to claim 10 wherein the compound is a vinyl halide.

18. A composition according to claim 11 wherein the compound has the formula

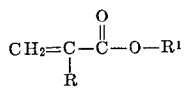

wherein R is selected from the group consisting of hydrogen and a methyl radical and R¹ is an alkyl radical having 1 to 6 carbon atoms, inclusive.

19. A composition according to claim 11 wherein the compound has the formula

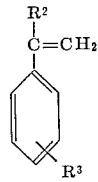

wherein R² is selected from the group consisting of hydrogen and a lower alkyl radical having 1 to 4 carbon atoms, inclusive, and R³ is selected from the group consisting of hydrogen, a lower alkyl radical having 1 to 4 carbon atoms, inclusive, and a halogen radical.

20. A composition according to claim 11 wherein the compound is a vinyl halide.

References Cited

UNITED STATES PATENTS

| | | |
|---|---|---|
| 2,710,274 | 6/1955 | Kuehl. |
| 2,921,407 | 1/1960 | Wagner et al. |
| 3,214,382 | 10/1965 | Windsor. |

FOREIGN PATENTS

| | | |
|---|---|---|
| 203,488 | 5/1959 | Austria. |
| 649,852 | 10/1962 | Canada. |

OTHER REFERENCES

McTaggert et al.: "Phototropic Effects in Oxides," Journal of Applied Chemistry, Dec. 5, 1955, pages 643–653.

McTaggert et al.: "Phototropic Effects in Oxides," Journal of Applied Chemistry, Jan. 8, 1958, pages 72–76.

MORRIS LIEBMAN, *Primary Examiner.*

ALAN LIEBERMAN, *Examiner.*